United States Patent
Chiou et al.

(10) Patent No.: US 7,058,699 B1
(45) Date of Patent: Jun. 6, 2006

(54) SYSTEM AND METHODS FOR IMPLEMENTING CODE TRANSLATIONS THAT ENABLE PERSISTENT CLIENT-SERVER COMMUNICATION VIA A PROXY

(75) Inventors: Greg I. Chiou, Saratoga, CA (US); Lev Stesin, San Francisco, CA (US); Arup Mukherjee, San Mateo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 425 days.

(21) Appl. No.: 09/650,273

(22) Filed: Aug. 29, 2000

Related U.S. Application Data (60) Provisional application No. 60/212,060, filed on Jun. 16, 2000.

(51) Int. Cl.
*G06F 13/00* (2006.01)

(52) U.S. Cl. .................. 709/219; 719/329; 717/140
(58) Field of Classification Search ............. 709/217, 709/219, 328, 329; 715/513; 717/106, 108, 717/136, 137, 140, 143, 147, 148, 162, 163, 717/167; 719/328, 329
See application file for complete search history.

(56) References Cited

U.S. PATENT DOCUMENTS

| | | | |
|---|---|---|---|
| 5,787,431 A | 7/1998 | Shaughnessy | |
| 5,884,083 A | 3/1999 | Royce et al. | |
| 5,890,171 A * | 3/1999 | Blumer et al. | 715/501.1 |
| 5,895,454 A | 4/1999 | Harrington | |
| 5,987,256 A | 11/1999 | Wu et al. | |
| 6,038,573 A * | 3/2000 | Parks | 707/513 |
| 6,128,644 A | 10/2000 | Nozaki | |
| 6,286,029 B1 * | 9/2001 | Delph | 709/203 |
| 6,286,138 B1 * | 9/2001 | Purcell | 717/11 |
| 6,292,936 B1 * | 9/2001 | Wang | 717/5 |
| 6,305,008 B1 * | 10/2001 | Vaidyanathan et al. | 717/111 |
| 6,393,389 B1 * | 5/2002 | Chanod et al. | 704/7 |
| 6,434,742 B1 * | 8/2002 | Koepele, Jr. | 717/140 |
| 6,499,052 B1 | 12/2002 | Hoang et al. | |

(Continued)

FOREIGN PATENT DOCUMENTS

WO     WO 01/11485 A2     2/2001

OTHER PUBLICATIONS

Brooks, C. et al., *Application-Specific Proxy Servers as HTTP Stream Transducers*, pp. 1-11.

(Continued)

*Primary Examiner*—Viet D. Vu
(74) *Attorney, Agent, or Firm*—John W. Branch; Darby & Darby PC (57) ABSTRACT

Systems and methods for extending or modifying the behavior of mobile (downloadable) software, such as JavaScript, HTML, and/or data that can be downloaded to a client device. One or more morphing agents are provided for translating and modifying code and data from a software source, such as a remote server. Each morphing agent translates and modifies one or more particular types of code. For example, one morphing agent may be provided for processing JavaScript code and another may be provided for processing HTML code and data. Each morphing agent typically includes a tokenizer module, a parser module and a translation module, each of which follows specific rule sets. Original software content is first tokenized according to a set of tokenizer rules, and subsequently parsed according to a set of parser rules. The parsed code is then translated according to the set of translator rules to produce the desired modified software content. An exception handler module is also provided for implementing exception rules when an exception occurs.

44 Claims, 3 Drawing Sheets

U.S. PATENT DOCUMENTS

| | | | |
|---|---|---|---|
| 6,523,171 B1* | 2/2003 | Dupuy et al. | 717/136 |
| 6,556,218 B1* | 4/2003 | Alcorn | 345/749 |
| 6,718,390 B1* | 4/2004 | Still et al. | 709/229 |
| 6,763,496 B1* | 7/2004 | Hennings et al. | 715/501.1 |
| 6,865,735 B1* | 3/2005 | Sirer et al. | 717/158 |
| 6,925,445 B1* | 8/2005 | Kisacanin | 705/26 |
| 2001/0016878 A1 | 8/2001 | Hideki | |
| 2001/0034743 A1* | 10/2001 | Thomas | 707/501.1 |
| 2005/0021862 A1* | 1/2005 | Schroeder et al. | 709/246 |

OTHER PUBLICATIONS

Derwent Accession No. 2001-354550; Hoang et al., 1999US-0372350 (Aug. 11, 1999), dated May 15, 2002.

From http://www.davidreilley.com/java/, these pages contain FAQ by Java developer, containing book reviews, source code, tips & tricks.

From http://www.javaskyline.com/learnservlets.html, containing organized set of resources for learning Java servlets on the Web, copyrighted Oct. 7, 1999.

From http://www.esperanto.org.nz/jsp, containing frequently ask questions with answer on JSP by Richard Vowles, copyrighted Jan. 25, 1999.

From http::WebDevelopersJournal.com/articles/into_to_servlets.html, An introduction to Java servlets, copyrighted Jan. 17, 1998.

From http://www.javaskyline.com/dev.html, Java Server Front-end Development; copyrighted Oct. 7, 1999.

From http://www.apl.jhu.edu/~hall/CWP.html, Core Web Programming; copyrighted Oct. 28, 1996.

Reilly, David, Java Network Programming FAQ at <http://www.davidreilley.com/java/java_network_programming/> (17 pages); Last Modified Apr. 27, 2000.

Learning Servlets: Web programs with many purposes at <http://www.javaskyline.com/learnservlets.html> (6 pages); Updated Nov. 19, 2001.

Bergsten, Hans, "An Introduction to Java Servlets" at <http://www.webdevelopersjournal.com/articles/intro_to_servlets.html> (11 pages) datedMar. 10, 1999.

Hall, Marty, "CORE Web Programming—In-depth Java 1.1, plus HTML, CGI, and JavaScript 1.2" at <http://www.apl.jhu.edu/~hall/CWP.html> (2 pages); undated.

* cited by examiner

SYSTEM AND METHODS FOR IMPLEMENTING CODE TRANSLATIONS THAT ENABLE PERSISTENT CLIENT-SERVER COMMUNICATION VIA A PROXY

CROSS-REFERENCES TO RELATED APPLICATIONS

This application is related to U.S. Provisional Patent Application Ser. No. 60/212,060, filed Jun. 16, 2000, entitled "Mobile Software Morphing Agent," the disclosure of which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

REFERENCE TO A COMPUTER PROGRAM LISTING APPENDIX

A computer program listing appendix, submitted on a compact disc, includes Appendices A, B1, B2, B3 and C as referred to herein. The computer program listing appendix is hereby incorporated by reference herein.

BACKGROUND OF THE INVENTION

The present invention relates generally to modifying and translating information received from a remote source, and more particularly to modifying and translating executable code and data received from a web site.

The World Wide Web (WWW), or "the Web", is now the premier outlet to publish information of all types and forms. Documents published on the web, commonly called Web pages, are typically published using a markup language such as HTML (or Hyper Text Markup Language), which sets standards for the formatting of documents. Additionally, These standards make it possible for people to read and understand documents no matter which program they use for that purpose. Often included in an HTML formatted web page are software code segments attached as part of the page. Examples of such software include JavaScript, Java and ActiveX commands. If a user's browser is enabled to process the software code, the code will typically be processed to provide additional windows, e.g., pop-up windows, forms and other content for presentation to the user.

Typically, a user accesses pages on the Web through a web portal. One common portal is Yahoo located at URL: http://www.yahoo.com/. When a user selects a reference such as a URL presented on a page provided by the portal, the users browser will access another page associated with the URL at a remote site. From then on, the user will be connected to the remote server unless the browser is instructed to return to the portal (e.g., via a "back" button or a "home" button displayed on the browser). In the commerce context, for example, a user may access a remote commerce site and conduct transactions, e.g., to purchase a product. In this case, the portal is completely unaware of any transactions or information exchange between the user and the remote site.

It is therefore desirable for a web portal to provide a page from a remote site, such as a remote commerce site, via a special proxy server to a user and to keep the user connected to the proxy so that information exchange between the user and remote server can be monitored by the proxy. However, it may be necessary to modify HTML formatting, HTML links and JavaScript code associated with a page provided by a remote site so that information exchange activity is directed to the proxy. For example, it is desirable to translate a link directed to a particular site into a link directed to the proxy so that the proxy handles access to the desired page from the particular site.

Accordingly, it is desirable to provide a configurable system to parse and translate downloadable software and/or content without additional development efforts from the original software and content provider. Additionally, it is desirable to provide an adaptive system to serve a corresponding software morphing agent to handle the original software and content.

SUMMARY OF THE INVENTION

The present invention provides systems and methods for extending or modifying the behavior of executable code and/or data that can be downloaded to a client device (e.g., a PC, laptop, PalmPilot, PDA or other hand-held communication device, etc.) implementing a browser program (e.g., Microsoft Internet Explorer, Netscape Navigator, a microbrowser such as a WAP enabled browser, etc.). The present invention is particularly useful for modifying web content, such as a web page received from a web site, including JavaScript code and/or HTML data.

According to the invention, one or more morphing agents are provided for translating and modifying code and data from a software source, such as a remote server. Each morphing agent translates and modifies a particular type of code. For example, one morphing agent may be provided for processing JavaScript code and another may be provided for processing HTML code and data. It will be appreciated that one morphing agent may be provided for processing multiple types of code, for example, one morphing agent for processing JavaScript and HTML code. Each morphing agent typically includes a tokenizer module, a parser module and a translation module, each of which implements specific rule sets. Original software content is first tokenized according to a set of tokenizer rules, and subsequently parsed according to a set of parser rules to determine relationships between the tokens. The parsed code is then translated according to the set of translator rules to produce the desired modified software content. An exception handler module is also provided for implementing exception rules when an exception occurs.

In operation, a user establishes a connection with a proxy server using the browser program on the client device, and the proxy server establishes a connection with the software source. The original software content is downloaded by the proxy server. All modules of a particular morphing agent can be located either on the client device or on the proxy server, or they may be spread between the client device and proxy server. Thus, if all modules reside on the proxy server, the morphing agent modifies the original software content and the modified content is downloaded to the client device. Similarly, if all modules reside on the client device, the original content is downloaded to the client device for processing by the morphing agent at the client device. If some of the modules reside on the proxy server, those module process the original content and the partially processed code is downloaded to the client device for processing by the remaining modules.

According to an aspect of the present invention, a computer implemented method is provided for modifying code to be compatible with a runtime library, wherein the code is received from a remote source. The method typically comprises the steps of receiving the code segment from the remote source, tokenizing the code segment into a plurality of tokens, and parsing the plurality of tokens so as to determine relationships between the plurality of tokens. The method also typically includes the step of translating the code segment into a modified code segment based on the determined relationships between the tokens such that the modified code segment is compatible with the runtime library.

According to another aspect of the present invention, a computer readable medium containing instructions for controlling a computer system to modify a code segment received from a remote source to be compatible with a runtime library is provided. The instructions typically include instructions to tokenize the code segment into a plurality of tokens, and parse the plurality of tokens so as to determine relationships between the plurality of tokens. The instructions also typically include instructions to translate the code segment into a modified code segment based on the determined relationships between the tokens such that the modified code segment is compatible with the runtime library.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
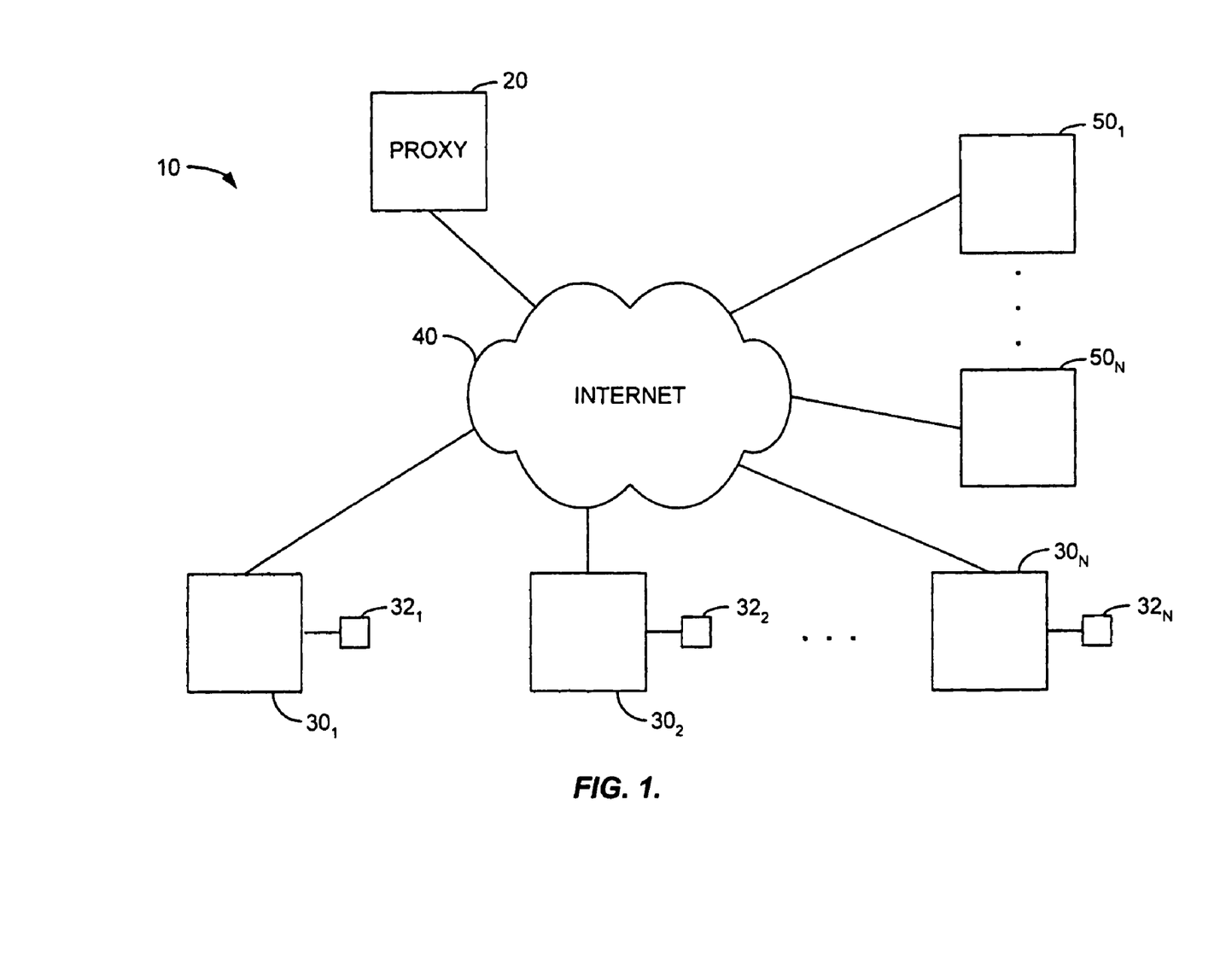
FIG. 1 illustrates a general overview of an information retrieval and communication network including a proxy server, client devices, and remote servers according to an embodiment of the present invention.

FIG. 1 illustrates a general overview of an information retrieval and communication network 10 including a proxy server 20, clients $30_1$ to $30_N$, and remote servers $50_1$ to $50_N$ according to an embodiment of the present invention. In computer network 10, clients $30_1$ to $30_N$ are coupled through the Internet 40, or other communication network, to proxy server 20 and servers $50_1$ to $50_N$. Only one proxy server 20 is shown, but it is understood that more than one proxy server can be used and that other servers providing additional functionality may also be interconnected to any component shown in network 10 either directly, over a LAN or a WAN, or over the Internet.

Several elements in the system shown in FIG. 1 are conventional, well-known elements that need not be explained in detail here. For example, each client 30 could be a desktop personal computer, workstation, cellular telephone, personal digital assistant (PDA), laptop, or any other computing device capable of interfacing directly or indirectly to the Internet. Each client 30 typically runs a browsing program, such as Microsoft's Internet Explorer, Netscape Navigator, or a WAP enabled browser in the case of a cell phone, PDA or other wireless device, or the like, allowing a user of client 30 to browse pages available to it from proxy server 20, servers $50_1$ to $50_N$ or other servers over Internet 40. Each client 30 also typically includes one or more user interface devices 32, such as a keyboard, a mouse, touchscreen, pen or the like, for interacting with a graphical user interface (GUI) provided by the browser on a monitor screen, LCD display, etc., in conjunction with pages and forms provided by proxy server 20, servers $50_1$ to $50_N$ or other servers. The present invention is suitable for use with the Internet, which refers to a specific global Internetwork of networks. However, it should be understood that other networks can be used instead of the Internet, such as an intranet, an extranet, a virtual private network (VPN), a non-TCP/IP based network, any LAN or WAN or the like.

According to one embodiment as will be described in more detail below, proxy server 20 and/or clients 30, and all of their related components are operator configurable using an application including computer code run using a central processing unit such as an Intel Pentium processor or the like. Computer code for operating and configuring proxy server 20 and/or clients 30 as described herein is preferably stored on a hard disk, but the entire program code, or portions thereof, may also be stored in any other memory device such as a ROM or RAM, or provided on any media capable of storing program code, such as a compact disk medium, a DVD, a floppy disk, or the like. Additionally, the entire program code, or portions thereof may be downloaded to clients 30 or otherwise transmitted as is well known, e.g., from proxy server 20 over the Internet, or through any other conventional network connection as is well known, e.g., extranet, VPN, LAN, etc., using any communication protocol as is well known.

In general, a user accesses and queries proxy server 20, servers $50_1$ to $50_N$, and other servers through a client 30 to view and download content such as news stories, advertising content, search query results including links to various websites and so on. Such content can also include other media objects such as video and audio clips, URL links, graphic and text objects such as icons and links, and the like. Additionally, such content is typically presented to the user as a web page formatted according to downloaded JavaScript code and HTML code and data as is well known. It will be appreciated that the techniques of the present invention are equally applicable to processing other types of code such as Java code and ActiveX code, and any markup language, including any instance of SGML, such as XML, WML, HTML, DHTML and HDML.

According to one embodiment of the invention, a user preferably accesses servers $50_1$ to $50_N$ through proxy server 20. In the context of electronic commerce, for example, a user may access a local commerce site that provides access (via URL or other selectable links or references) to remote commerce sites, such as individual commerce web sites. One such system is described in U.S. patent application Ser. No. 09/372,350, entitled "Electronic Commerce System for Referencing Remote Commerce Sites at a Local Commerce Site," filed Aug. 11, 1999, the contents of which are hereby incorporated by reference in their entirety for all purposes. As described therein, a Remote Merchant Integration Server (RMIS) provides an interface to multiple merchant web sites. A user that accesses a remote commerce site through the RMI proxy is presented with a slightly modified version of the commerce site by the RMI server. Any requests from the user to a remote commerce site is managed by the RMI server and any responses by the remote commerce site are also managed by the RMI server transparently to both the user and the remote commerce site. One advantage of such a system includes the ability to provide, in the commerce context, a single shopping basket to a user who desires to shop at multiple remote commerce sites. Another advantage is the ability to track transactional information associated with users' purchases at the various merchant sites. An example of such a system can be located on the Internet at the Yahoo! Shopping site (URL: http://shopping.yahoo.com/). In this example, it is desirable to modify JavaScript code and HTML code and data received from the remote commerce sites using the techniques of the present invention to facilitate integration of the RMI system and to maintain user connection to the RMI system during transactions with the remote commerce sites.

According to an embodiment of the present invention, a set of different software morphing agents are provided for handling different kinds of software technologies. For example, one morphing agent (MA) is provided for handling JavaScript and another MA is provided for handling HTML. The MA for each type of the original third-party software technology is delivered to the appropriate device(s), e.g., proxy server 20 and/or a client device 30.

Figure 2:
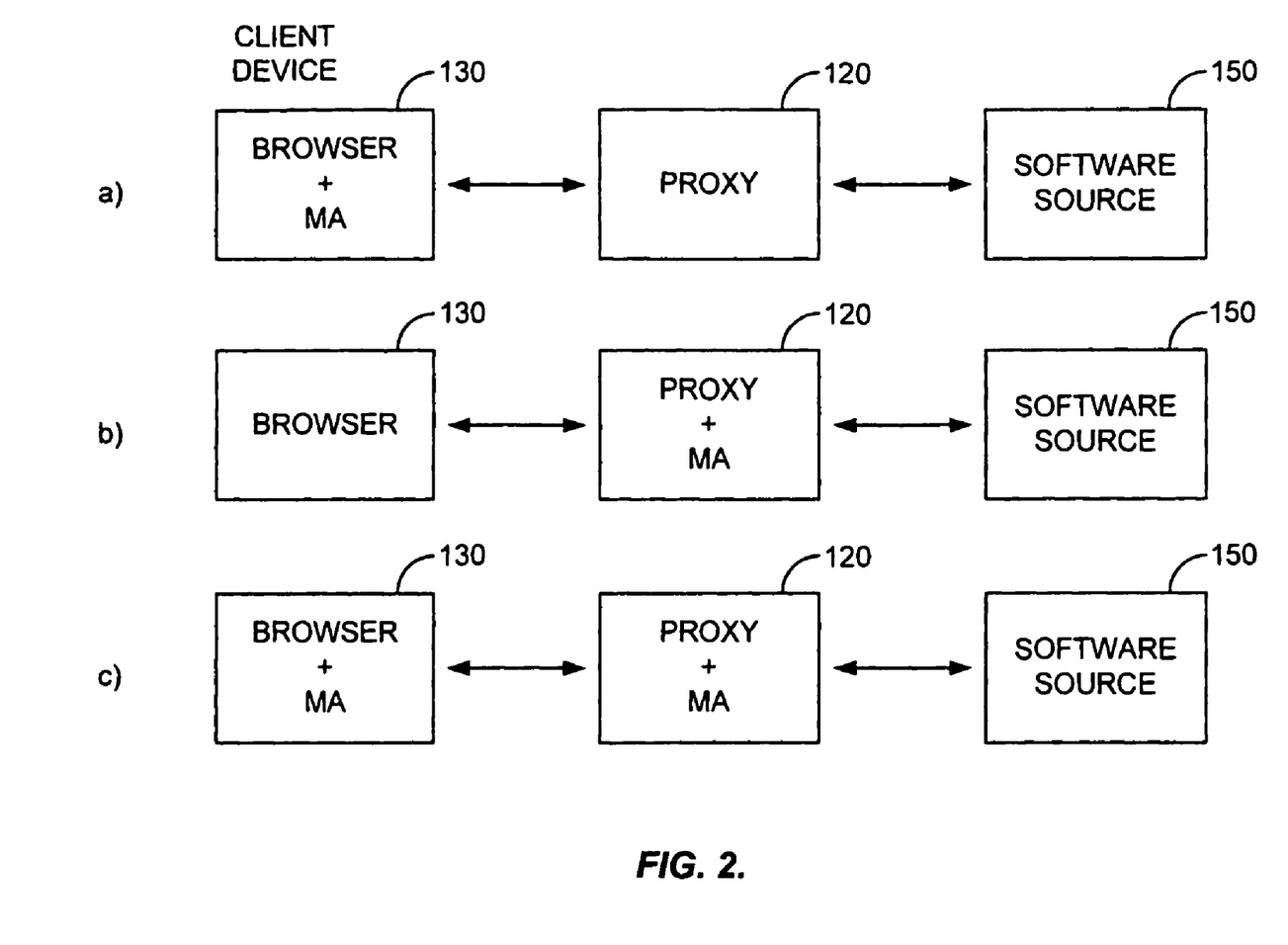
FIG. 2 illustrates various configurations of a runtime environment of a morphing agent according to embodiments of the present invention.

FIG. 2 illustrates various exemplary configurations of a runtime environment of a morphing agent (MA) according to embodiments of the present invention. As shown in each configuration, a software source 150, such as a server 50 in FIG. 1, provides software to a client device 130 through proxy 120. Depending on the particular MA and its configuration, the software will be modified at the proxy 120, at the client device 130 or partially at the proxy 120 and partially at the client device 130. In configuration a), for example, all components of a particular MA are downloaded to a client device 130 and run in conjunction with a browser application. In configuration b), all components of a particular MA are loaded and run at a proxy server 120. In configuration c), for a particular MA, some components are loaded and run at a proxy server 120 while other components are downloaded to, and run at, a client device 130.

In general, if the code to be modified includes portions that are dynamically assembled, it is preferred that all components for the MA be downloaded to the client device (configuration a). One example of dynamically assembled code in JavaScript could be represented as x+y+"s", where the portion "s" is dynamically assembled or generated by the browser application resident on the client device. Thus, it is preferred that all components of a JavaScript MA be installed on the client side, e.g., at client device 130 to parse and translate dynamically assembled code such as portion "s."

Figure 3:
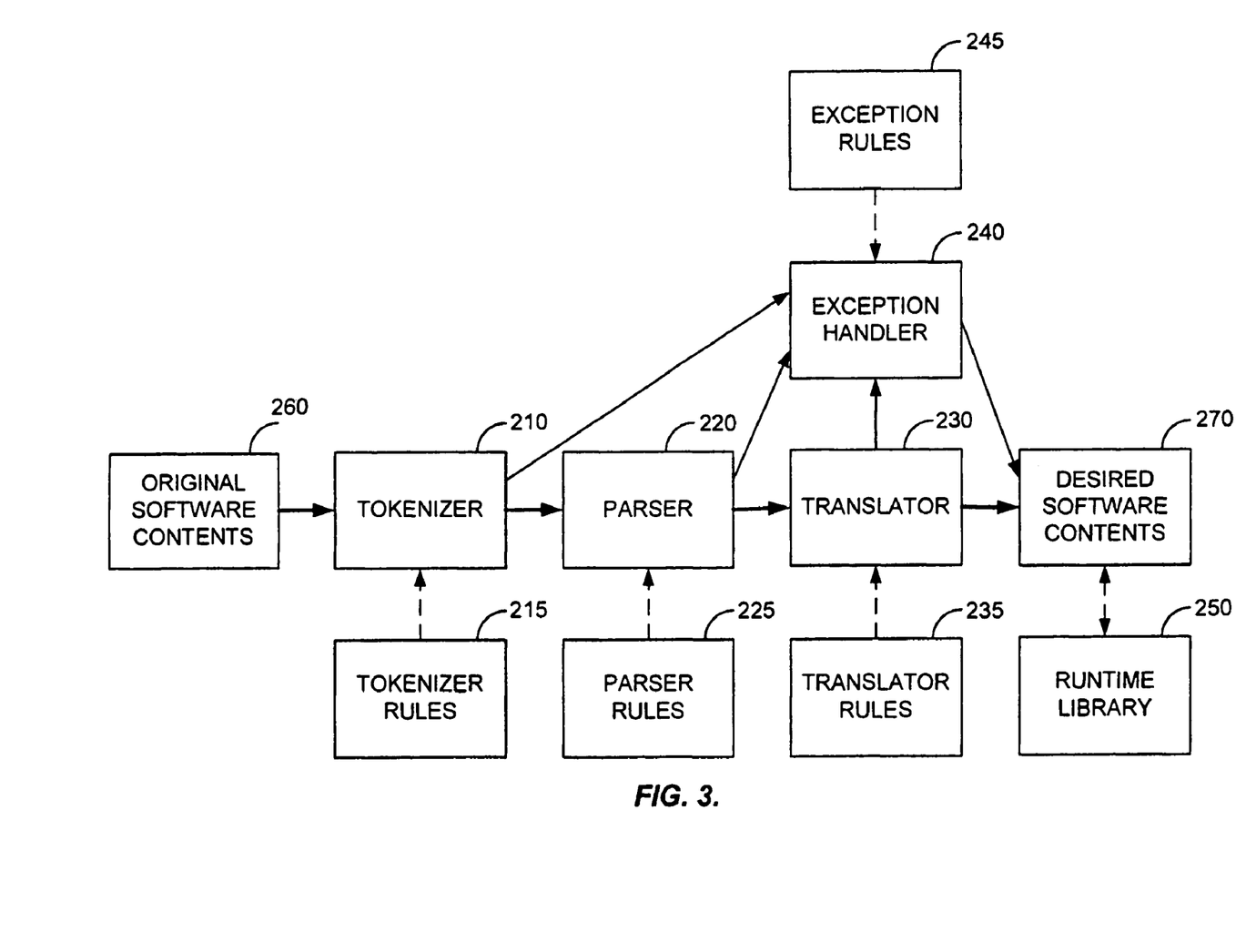
FIG. 3 illustrates a general processing flow between modules of a morphing agent according to an embodiment of the present invention.

FIG. 3 illustrates a general processing flow between modules of a morphing agent according to an embodiment of the present invention. As shown, each morphing agent (MA) includes a tokenizer module 210, a parser module 220 and a translator module 230. Associated with each module is a corresponding rule set, e.g., tokenizer rule set 215, parser rule set 225, and translator rule set 235. An exception handler 240, and associated exception rules set 245, is optionally provided for handling exceptions that occur dur-ing the software modification and translation process. Each MA also includes a client-side Runtime Library 250 that includes functions, variable and data configured to run with a browser application. One example of a runtime library can be found in Appendix A.

In operation, before the original software content 260 is processed or executed, all necessary MA components for modifying that particular software type must be installed at the client device 130 (via downloading) and/or at a proxy server 120. The MA then "morphs" (e.g., tokenizes, parses and translates) the original software content 260 into the desired software content 270. Optionally provided exception handler 240 handles any errors that occur during the morphing process. In one embodiment, if an exception, or error, occurs during the morphing process, the exception handler causes the process to be bypassed. The tokenizer 210, parser 220, translator 230, and exception handler 240 are all configurable via their respective rule sets (i.e. 215, 225, 235, 245). The desired output 270 can then work together with the client-side runtime library 250 (via downloading) in a user's browser.

Once the original software content is received, tokenizer module 210 analyzes the string of characters representing a code segment and maps the characters to various token types according to the tokenizer rule set 215. Typical JavaScript token types include string, integer, keyword, identifier, etc. Parser 220 then parses the resulting set of tokens according to the parser rule set 225 to determine relationships between the token types associated with the code segment being analyzed. In one embodiment, a hierarchical tree structure relating the various tokens is created. One example of tokenizer and parser code useful for tokenizing and parsing JavaScript is the NGS JavaScript Interpreter which can be located and downloaded from the Internet at URL: http://www.ngs.fi/js/, the contents of which are hereby incorporated for reference for all purposes. Translator module 230 then transforms the code segment into the desired software content 270 based on the specific translator rule set 235, the token types, and the relationships between the tokens determined by parser 220.

It may be necessary to modify the above NGS JavaScript Interpreter (tokenizer and parser, in particular) to run more efficiently when integrated with a browser application such as Microsoft Internet Explorer or Netscape Navigator. Appendix B includes examples of a modified tokenizer and parser from NGS JavaScript Interpreter, translator code and code for integrating the modified tokenizer and parser with a Browser, according to one embodiment of the present invention.

A typical translator module (230+235) of an MA for transforming JavaScript transforms function calls and variables to new function calls and variables to be used together with a client-side runtime library 250 in a user's browser. For example, a function call "open( )" is translated according to one embodiment as follows:

"open (URL, TARGET, OPT)" is translated to

"new_function1(URL, TARGET, OPT)", where the function "new_function1( )" is implemented in the client-side runtime library.

Similarly, a variable assignment expression is translated according to one embodiment as follows:

"OBJ.location=URL" is translated to

"OBJ.location=new_function2(URL)", where the function "new_function2" is implemented in the client-side runtime library.

Appendix C illustrates examples of translation rules (e.g., 235) for translating function calls and variables according to one embodiment of the present invention.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer implemented method of modifying code to be compatible with a runtime library, wherein the code is received from a remote source, the method comprising the steps of:
    receiving a code segment from the remote source, wherein the code segment
    includes a first reference that identifies information stored at the remote source; tokenizing the code segment into a plurality of tokens;
    parsing the plurality of tokens so as to determine relationships between the plurality of tokens;
    translating the code segment into a modified code segment based on the determined relationships between the tokens such that the modified code segment is compatible with the runtime library, including translating the first reference to a second reference that is directed to a proxy server such that the modified code segment includes the second reference directed to the proxy server,
    wherein usage of the second reference in a client device causes a request identifying the information stored at the remote source to be sent to the proxy server rather than the remote source, and wherein the proxy server requests the identified information from the remote source.

2. The method of claim 1, wherein the code segment includes one of a JavaScript code segment, a Java code segment, an ActiveX code segment and a markup language segment.

3. The method of claim 1, wherein the runtime library is linked to a browser application in a client device communicably coupled to the proxy server, and wherein the steps of receiving, tokenizing, parsing and translating the code segment are performed in the proxy server.

4. The method of claim 3, further including the step of sending the modified code from the proxy server to the client device to be processed by the browser.

5. The method of claim 3, wherein the client device is communicably coupled to the proxy server over the Internet.

6. The method of claim 1, wherein the proxy server performs the steps of receiving, tokenizing, parsing and translating the code segment.

7. The method of claim 1, wherein the runtime library is linked to a browser application in a client device communicably coupled to the proxy server, wherein the step of receiving the code segment from the remote source is performed in the proxy server, wherein the steps of tokenizing, parsing and translating the code segment are performed in the client device, and wherein the method further includes the step of sending the code segment from the proxy server to the client device.

8. The method of claim 7, wherein the code segment includes a dynamically assembled portion.

9. The method of claim 7, wherein the client device is communicably coupled to the proxy server over the Internet.

10. The method of claim 1, wherein the step of translating includes translating a first function call to a second function call, wherein the second function call is compatible with the runtime library.

11. The method of claim 1, wherein the step of translating includes translating a function call to a variable, wherein the variable is compatible with the runtime library.

12. The method of claim 1, wherein the step of translating includes translating a first variable to a second variable, wherein the second variable is compatible with the runtime library.

13. The method of claim 1, wherein the step of translating includes translating a variable to a function call, wherein the function call is compatible with the runtime library.

14. The method of claim 1,
    wherein the code segment includes one or more first elements selected from the group consisting of:
    digits, characters, keywords, literals, identifiers, operators, expressions, statements, variables, regular expressions, functions, arguments and programs;
    wherein the modified code segment includes one or more second elements selected from the group consisting of:
    digits, characters, keywords, literals, identifiers, operators, expressions, statements, variables, regular expressions, functions, arguments and programs; and wherein the second elements are compatible with the runtime library.

15. A computer readable medium containing instructions for controlling a computer system to modify a code segment received from a remote source to be compatible with a runtime library, by:
    tokenizing the code segment into a plurality of tokens, wherein the code segment includes a first reference that identifies information stored at the remote source;
    parsing the plurality of tokens so as to determine relationships between the plurality of tokens;
    translating the code segment into a modified code segment based on the determined relationships between the tokens such that the modified code segment is compatible with the runtime library, including translating the first reference to a second reference that is
    directed to a proxy server such that the modified code segment includes the second reference directed to the proxy server,
    wherein usage of the second reference in a client device causes a request identifying the information stored at the remote source to be sent to the proxy server rather than the remote source, and wherein the proxy server requests the identified information from the remote source.

16. The computer readable medium of claim 15, wherein the code segment includes one of a JavaScript code segment, a Java code segment, an ActiveX code segment and a markup language segment.

17. The computer readable medium of claim 15, further comprising instructions for handling an exception when an exception occurs.

18. The computer readable medium of claim 15, wherein the runtime library is implemented on a client device communicably coupled to the proxy server.

19. The computer readable medium of claim 15, wherein the instructions for translating include instructions for translating a function call to a variable, wherein the variable is compatible with the runtime library.

20. The computer readable medium of claim 15, wherein the instructions for translating include instructions for translating a first variable to a second variable, wherein the second variable is compatible with the runtime library.

21. The computer readable medium of claim 15, wherein the instructions for translating include instructions for translating a first function call to a second function call, wherein the second function call is compatible with the runtime library.

22. The computer readable medium of claim 15, wherein the instructions for translating include instructions for translating a variable to a function call, wherein the function call is compatible with the runtime library.

23. The computer readable medium of claim 15,
wherein the code segment includes one or more first elements selected from the group consisting of:
digits, characters, keywords, literals, identifiers, operators, expressions, statements, variables, regular expressions, functions, arguments and programs;
wherein the modified code segment includes one or more second elements selected from the group consisting of:
digits, characters, keywords, literals, identifiers, operators, expressions, statements, variables, regular expressions, functions, arguments and programs; and wherein the second elements are compatible with the runtime library.

24. The computer-implemented method of claim 1, wherein the first reference includes a destination link directed to the remote site, and wherein the second reference includes a destination link identifying the remote site but directed to the proxy server.

25. The computer-implemented method of claim 1, wherein the first reference includes an HTML link with a URL directed to the remote site, and wherein the second reference includes a second HTML link with a second URL directed to the proxy server.

26. The computer readable medium of claim 15, wherein the first reference includes a destination link directed to the remote site, and wherein the second reference includes a destination link identifying the remote site but directed to the proxy server.

27. The computer readable medium of claim 15, wherein the first reference includes an HTML link with a URL directed to the remote site, and wherein the second reference includes a second HTML link with a second URL directed to the proxy server.

28. A computer-implemented method of modifying code to be compatible with a runtime library resident on a client device, the method comprising:
receiving a code segment by the client device from a proxy server, wherein the proxy server retrieved the code segment from a remote source in response to a first request from the client device for information stored at the remote source;
tokenizing the code segment into a plurality of tokens;
parsing the plurality of tokens so as to determine one or more relationships between the plurality of tokens;
translating the code segment into a modified code segment based on the determined relationships between the tokens such that the modified code segment is compatible with the runtime library, wherein subsequent usage of the modified code segment at the client device causes a second request identifying information stored at the remote source to be sent to the proxy server that requests the identified information from the remote source for the client device; and
wherein tokenizing, parsing and translating are performed by the client device.

29. The method of claim 28, wherein the runtime library is linked to a browser application in the client device, and wherein the client device is communicably coupled with the proxy server over the Internet.

30. The method of claim 28, wherein the code segment includes a dynamically assembled portion.

31. The method of claim 28, wherein translating includes one or more of:
translating a first function call to a second function call compatible with the runtime library;
translating a function call to variable compatible with the runtime library; and
translating a first variable to a second variable compatible with the runtime library; and
translating a variable to a function call compatible with the runtime library.

32. A computer-implemented method of modifying code to be compatible with a runtime library resident on a client device, the method comprising:
receiving a code segment by a proxy server, wherein the proxy server retrieved the code segment from a remote source in response to a first request from the client device identifying information stored at the remote source;
tokenizing the code segment into a plurality of tokens;
parsing the plurality of tokens so as to determine one or more relationships between the plurality of tokens; and
translating the code segment into a modified code segment based on the determined relationships between the tokens such that the modified code segment is compatible with the runtime library, wherein usage of the modified code segment at the client device causes a second request identifying information stored at the remote source to be sent to the proxy server that subsequently requests the identified information from the remote source for the client device; and
wherein one or more of the steps of tokenizing, parsing and translating are performed by the client device, and wherein all other steps are performed by the proxy server.

33. The method of claim 32, wherein the runtime library is linked to a browser application in the client device, and wherein the client device is communicably coupled with the proxy server over the Internet.

34. The method of claim 32, wherein translating includes one or more of:
translating a first function call to a second function call compatible with the runtime library;
translating a function call to variable compatible with the runtime library; and translating a first variable to a second variable compatible with the runtime library; and
translating a variable to a function call compatible with the runtime library.

35. A computer implemented method, comprising:
receiving a code segment over a network connection, the code segment including a first reference to information stored at a remote site, wherein usage of the first reference would cause a message to be sent to the remote site; and
modifying the code segment to be compatible with a runtime library, including translating the first reference to a second reference that is directed to a proxy server, wherein the compatibility for the modified code segment with the runtime library is arranged in accordance with tokenized relationships for the modified code segment and wherein usage of the second reference in a client device causes a message that identifies the information stored at the remote site to be sent to the proxy server instead of the remote site, and wherein the proxy sends a request for the identified information to the remote site for the client device.

36. The method of claim 35, wherein receiving and modifying are performed in a client device communicably coupled with the proxy server, and wherein the code segment is received from the proxy server.

37. The method of claim 35, wherein the code segment is received from the remote site and wherein modifying is performed partially in a client device communicably coupled with the proxy server and partially in the proxy server.

38. The method of claim 35, wherein the first reference includes a destination link with a URL directed to the remote site, and wherein the second reference includes a destination link with a URL directed to the proxy server.

39. The method of claim 35, wherein the second reference includes information identifying the remote site.

40. A computer implemented method of establishing a persistent communication session between a client system and a proxy server wherein the client system is able to interact with a plurality of remote sites via the same proxy server across multiple network requests, the method comprising:

establishing a communication session between the client system and a proxy server;

receiving at the proxy server a plurality of first code segments from a corresponding plurality of remote sites, each first code segment including a first reference to information stored at the corresponding remote site, wherein usage of the first reference in each first code segment would cause a network request to be sent to the corresponding remote site;

translating the first reference of each first code segment to a second reference that modifies each first code segment and identifies the corresponding remote site but is directed to the proxy server, wherein usage of each modified first code segment's second reference in the client system causes a network request to be sent to the proxy server rather than the corresponding remote site, and wherein a compatibility for the modified first code segment with a runtime library is arranged in accordance with tokenized relationships for each modified first code segment; and using, in the client system, one or more of the second references of each modified first code segment such that one or more corresponding network requests for information stored by the remote sites are sent to the proxy server, and wherein the proxy server sends requests originated by the client system for the identified information to the remote sites.

41. The method of claim 40, wherein using one or more of the second references is performed in the client system with or without a user input.

42. The method of claim 40, wherein translating is performed entirely within the proxy server, the method further including sending translated code segments with the second references to the client system.

43. The method of claim 40, wherein translating is performed entirely within the client system, the method further including sending the first code segments to the client system.

44. The method of claim 40, wherein translating is performed partially within the proxy server and partially within the client system, the method further including sending partially translated code segments to the client system.

* * * * *

UNITED STATES PATENT AND TRADEMARK OFFICE
CERTIFICATE OF CORRECTION

| | | |
|---|---|---|
| PATENT NO. | : 7,058,699 B1 | Page 1 of 1 |
| APPLICATION NO. | : 09/650273 | |
| DATED | : June 6, 2006 | |
| INVENTOR(S) | : Greg I. Chiou et al. | |

It is certified that error appears in the above-identified patent and that said Letters Patent is hereby corrected as shown below:

Title Page

Page 2, Col. 2 (Other Publications), Below "Programming; copyrighted Oct. 28, 1996."

insert -- Hideki, PGPub-Document No.: 20010016878 -Aug. 23, 2001, Communicating system & method for controlling throughput. --.

Page 2, Col. 2 (Other Publications), Line 17, "datedMar." and insert -- dated Mar. --. (Consider space)

Title Page #54 and

Column 1, Line 1, Delete "SYSTEM" and insert -- SYSTEMS --.

Column 1, Line 11, Delete "60/212,060," and insert -- 60/212,060 (Atty. Docket No. 017887-005300), --.

Column 4, Line 65, Delete "09/372,350," and insert --09/372,350 (Atty. Docket No. 017887-002500), --.

Column 5, Line 56, "client side," and insert -- client-side, --.

Column 6, Line 19 (Approx.) Delete "i.e." and insert -- i.e., --.

Column 11, Line 2, In Claim 35, after "segment" insert -- , --.

Signed and Sealed this

Tenth Day of April, 2007

JON W. DUDAS
*Director of the United States Patent and Trademark Office*